United States Patent
Kristoffersen et al.

(10) Patent No.: US 8,644,350 B2
(45) Date of Patent: Feb. 4, 2014

(54) PACKET-BASED TIMING MEASUREMENT

(71) Applicants: Arne Kristoffersen, Brondby Strand (DK); Morten Terstrup, Soeborg (DK)

(72) Inventors: Arne Kristoffersen, Brondby Strand (DK); Morten Terstrup, Soeborg (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 0 days.

(21) Appl. No.: 13/679,672

(22) Filed: Nov. 16, 2012

(65) Prior Publication Data

US 2013/0128903 A1  May 23, 2013

Related U.S. Application Data

(60) Provisional application No. 61/563,395, filed on Nov. 23, 2011.

(51) Int. Cl.
  *H04J 3/06* (2006.01)
(52) U.S. Cl.
  USPC .............................. 370/503; 370/509; 370/512
(58) Field of Classification Search
  USPC ................. 370/503, 509, 504, 510, 324, 252; 713/400, 401; 375/371
  See application file for complete search history.

(56) References Cited

U.S. PATENT DOCUMENTS

| | | | |
|---|---|---|---|
| 6,480,483 B2 * | 11/2002 | Yahata et al. | 370/350 |
| 6,816,510 B1 * | 11/2004 | Banerjee | 370/503 |
| 6,985,499 B2 * | 1/2006 | Elliot | 370/503 |
| 7,055,050 B2 * | 5/2006 | Domon | 713/400 |
| 7,120,092 B2 * | 10/2006 | del Prado Pavon et al. | 368/46 |
| 8,190,680 B2 * | 5/2012 | Spilo et al. | 709/204 |
| 8,274,998 B2 * | 9/2012 | Belhadj et al. | 370/503 |
| 2009/0310726 A1 * | 12/2009 | Alankry et al. | 375/359 |
| 2010/0118721 A1 * | 5/2010 | Sakurada et al. | 370/252 |
| 2011/0035511 A1 * | 2/2011 | Biederman | 709/248 |

FOREIGN PATENT DOCUMENTS

| | | |
|---|---|---|
| EP | 2388962 | 11/2011 |
| WO | WO 03/075488 | 9/2003 |

OTHER PUBLICATIONS

International Search Report on related PCT Application No. PCT/US2012/065688 from International Searching Authority (KIPO) dated Jan. 30, 2013.
Written Opinion on related PCT Application No. PCT/US2012/065688 from International Searching Authority (KIPO) dated Jan. 30, 2013.

* cited by examiner

*Primary Examiner* — Rasheed Gidado
(74) *Attorney, Agent, or Firm* — Klein, O'Neill & Singh, LLP

(57) ABSTRACT

A slave communication device may transmit a packet to the master communication device, with the packet including a transmission time field and a correction field. The transmission time field may contain a value indicative of an approximate time of transmission of the packet by the slave communication device, and the correction field may contain a value indicative of a difference between the approximate time of transmission and an actual time of transmission of the packet by the slave communication device.

17 Claims, 6 Drawing Sheets

PACKET-BASED TIMING MEASUREMENT

CROSS REFERENCE TO RELATED APPLICATIONS

This application claims the benefit of U.S. Provisional Application No. 61/563,395, filed on Nov. 23, 2011, the disclosure of which is incorporated herein by reference.

BACKGROUND OF THE INVENTION

The present invention relates generally to synchronization of clocks and, more particularly, to delay measurements and/or synchronization of clocks in a packet-switched communication network.

It may be advantageous in a networked system for devices in the network to have a common time base. The common time base may be used, for example, to trigger coordinated measurement instances in a network of sensors, to coordinate actions of controllers in an industrial system, or to coordinate time intervals used in a wireless communication system.

The electronics industry has developed several standard protocols for use in synchronizing clocks, for example, the Network Time Protocol (NTP) and the Precision Time Protocol (PTP) of IEEE Std. 1588. PTP includes sending timing-related messages between nodes in a communication network. The timing-related messages include, for example, a node transmitting a time-stamped packet to supply its time base to another node and a node transmitting a packet requesting the receiving node to reply with the time of receipt. Efficient handling of timing-related messages is beneficial so as to avoid interfering with other communication. Furthermore, any errors in handling the timing-related messages may be detrimental to accurate clock synchronization.

BRIEF SUMMARY OF THE INVENTION

Some aspects of the present invention provide a method of determining a time of transit of a packet over a communication network, comprising: providing a physical layer portion of a slave communication device a packet including a value indicating an approximate time of transmission of the packet by the slave communication device; having the physical layer portion of the slave communication device insert a correction value into the packet, the correction value indicating a difference between the approximate time of transmission and an actual time of transmission of the packet by the slave communication device; transmitting, by the physical layer portion of the slave communication device, the packet to a master communication device; receiving, by the slave communication device, a responsive packet from the master communication device, the responsive packet including a time value indicating a time of receipt of the packet by the master communication device and an indication of the correction value; and calculating the time of transit by the packet over the communication network using the approximate time of transmission, the indication of the correction value, and the time of receipt by the master communication device.

Another aspect of the invention provides a network communication device for determining a time of transit for a packet over a communication network, comprising: at least one port for transmitting and receiving network packets: a higher layer configured to provide packets to a physical layer, at least some of the packets including a value indicating an approximate time of transmission of the packet by the communication device; and the physical layer configured to insert a correction value in at least some of the packets the correction value indicating a difference between the approximate time of transmission and the actual time of transmission of the packet by the communication device, to transmit the packet over a communication network to a master communication device, to receive responsive packets from the master communication device, at least some of the responsive packets including a time value indicating a time of receipt of the packet by the master communication device and the correction value.

Another aspect of the invention provides a method for determining a time of transit for a packet over a communication network, comprising: receiving from a media access controller (MAC) by a packet physical layer portion of a slave communication device, the packet including a value indicating an approximate time of transmission of the packet by the slave communication device; modifying a correction field of the packet to indicate a difference between the approximate time of transmission and an actual time of transmission of the packet by the slave communication device; transmitting the packet from the physical layer portion of the slave communication device over a communication network to a master communication device; receiving, by the slave communication device, a responsive packet from the master communication device, the responsive packet including a time value indicating a time of receipt of the packet by the master communication device and the correction value: and calculating the time in transit of the packet over the communication network using the approximate time of transmission, the correction value, and the time of receipt by the master communication device.

These and other aspects of the invention are more fully comprehended upon review of this disclosure.

DETAILED DESCRIPTION

Figure 1:
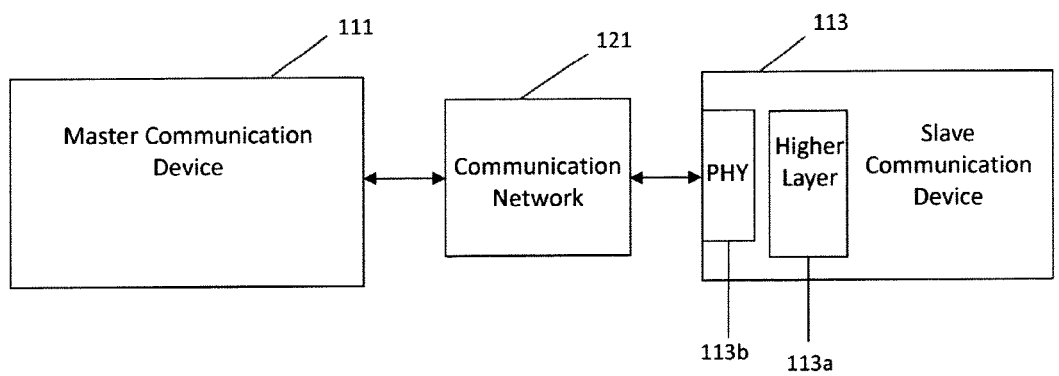
FIG. 1 is a block diagram of communication system in accordance with aspects of the invention.

FIG. 1 is a block diagram of communication system in accordance with aspects of the invention. The system includes a master communication device 111 and a slave communication device 113. The master communication device 111 and the slave communication device 113 communicate through a communication network 121. The communication network 121 includes physical links between the devices, as well as possibly other communication devices such as switches or routers or other network nodes.

The slave communication device, for example, includes a physical layer portion 113b coupled to the communication network. The physical layer portion transmits information over and receives information from the communication network. A higher layer portion 113a of the slave communication device in turn provides information to the physical layer portion for transmission over the network, and receives information from the physical layer portion which was received over the communication network. In some instances the higher layer portion may be a media access controller (MAC) portion, in some instances the higher layer portion may be a MAC and other portions of the slave communication device, and in some instances the higher layer portion may be other circuitry, possibly including a processor or processors, within the slave communication device.

In some aspects of the invention, the slave communication device may determine a time of transit by a packet over the communication network by having the higher layer portion provide the physical layer portion a packet including a value indicating an approximate time of transmission of the packet by the slave communication device; having the physical layer portion insert a correction value into the packet, with the correction value indicating a difference between the approximate time of transmission and an actual time of transmission of the packet by the slave communication device; having the physical layer portion transmit the packet to the master communication device; receiving from the master communication device a responsive packet including a time value indicating a time of receipt of the packet by the master communication device and an indication of the correction value; and calculating the time of transit by the packet over the communication network using the approximate time of transmission, the indication of the correction value, and the time of receipt by the master communication device.

In various embodiments in accordance with aspects of the invention, the slave communication device may transmit a packet to the master communication device, with the packet including a transmission time field and a correction field. The transmission time field may contain a value indicative of an approximate time of transmission of the packet by the slave communication device, and the correction field may contain a value indicative of a difference between the approximate time of transmission and an actual time of transmission of the packet by the slave communication device. The master communication device will, after receipt of the packet, transmit a responsive packet to the slave communication device. The responsive packet will generally include a receipt time field and a correction field, with the receipt time field indicating a time of receipt by the master communication device of the packet and the correction field including the value, as received by the master communication device, of the correction field in the packet transmitted by the slave communication device. The slave communication device may thereafter calculate transit time of the packet over the communication network using the approximate transmission time, the time of receipt by the master communication device, and the value of the correction field. In various embodiments the higher layer portion of the slave communication device provides the value of the approximate time of transmission, and the physical layer portion provides the value for the correction field.

In accordance with aspects of the invention, in some embodiments the higher layer portion of the slave communication device inserts an approximate transmission time into a transmission time field of a packet to be transmitted to the master communication device. The approximate transmission time indicates an approximate time of transmission of the packet by the slave communication device, and is generally only approximate as the time of residence of the packet in the physical layer portion, prior to transmission, may not be known by the higher layer portion. The physical layer portion of the slave communication device, which is more immediately coupled to the communication network, thereafter inserts a correction time into a correction field of the packet. The correction time indicates an amount of correction to be made to the approximate transmission time such that the corrected approximate transmission time equals the actual transmission time of the packet from the slave communication device.

In various embodiments the higher-layer portion of the slave communication device places an approximate transmission time in the Delay_Req message and supplies the message to the physical layer portion 113b of the slave communication device. The physical layer portion determines the actual transmission time for the Delay_Req message and inserts a correction value in the message to indicate the difference between the approximate time and the actual transmission time. The correction value is placed in a correction field of the Delay_Req message, and the correction value is returned in a correction field in a Delay_Resp message from the master communication device. The higher layer portion uses the reception time and correction value from the Delay_Resp message in combination with the approximate time to calculate the delay from the slave communication device 113 to the master communication device 111.

In the various embodiments, the physical layer portion does not need to retain information as to the actual transmission time or to directly provide the higher layer portion such information, other than by way of providing information of the Delay_Resp packet or similar packet, and in many embodiments the physical layer portion does not retain or provide such information other than by providing information of the Delay_Resp packet or similar packet.

In some embodiments in accordance with aspects of the invention, the master communication device and the slave communication device may utilize PTP. An example sequence in accordance with aspects of the invention is described using PTP terminology, although other protocols may also be used. The master communication device 111 may transmit a packet with a Sync message and a transmission time of the Sync message. The transmission time may be included in the Sync message or may be in a separate packet with a Follow_Up message. When the slave communication device 113 receives the packet with the Sync message, it determines the reception time. The difference between the reception time and the transmission time of the packet with the Sync message is indicative of the delay from the master communication device 111 to the slave communication device 113

The slave communication device 113 transmits a packet with a Delay_Req message, to which the master communication device 111 replies by transmitting a packet with a Delay_Resp message. The Delay_Resp message includes an indication of the time when the packet with the Delay_Req message was received by the master communication device. The difference between the time of reception of the Delay_Req message by the master communication device and the time when the slave communication device 113 transmitted the Delay_Req message is indicative of the delay from the slave communication device 113 to the master communication device 111.

In various embodiments a higher-layer portion 113a of the slave communication device places an approximate transmission time in the Delay_Req message and supplies the message to a physical layer portion 113b of the slave communication device. The physical layer portion determines the actual transmission time for the Delay_Req message and inserts a correction value in the message to indicate the difference between the approximate time and the actual transmission time. The correction value is placed in a correction field of the Delay_Req message, and the correction value is returned in a correction field in the Delay_Resp message. The higher layer portion uses the reception time and correction value from the Delay_Resp message in combination with the approximate time to calculate the delay from the slave communication device 113 to the master communication device 111. Using such methodology, the physical layer portion does not need to retain information as to the actual transmission time or to directly provide the higher layer portion such information, other than by way of providing information of the Delay_Resp packet, and in many embodiments the physical layer portion does not retain or provide such information other than by providing information of the Delay_Resp packet.

The slave device may assume that delays from the master communication device 111 to the slave communication device 113 and from the slave communication device 113 to the master communication device 111 are equal. The slave device may also assume that offsets between the clocks of the master communication device 111 and the slave communication device 113 are equal for the Sync message and the Delay_Req message. With these assumptions, the delay may be calculated as the average of the delays from the master communication device 111 to the slave communication device 113 and from the slave communication device 113 to the master communication device 111, and the offset may be calculated as the difference between the delays from the master communication device 111 to the slave communication device 113 and from the slave communication device 113 to the master communication device 111. For example, the slave communication device 113 may calculate the delay as ½ ((t2−t1)+(t4−t3)), where t1 and t2 are the transmission and reception times of the Sync message, t3 and t4 are the transmission and reception times of the Delay_Req message, and t3 is calculated as the approximate time plus the correction value.

The correction value in the Delay_Req message may be modified as the packet containing the message is transported from the slave device through the communication network to the master device. For example, a switch in the communication network may process the timing message to provide a transparent clock by increasing the correction value to account for the time that the packet is resident in the switch. Neither the master communication device nor the slave communication device modifies its operation due to modifications made to the correction value during transport of the packet. Since a delay in transporting the packed is indicated in the correction value in an equivalent manner to a difference between the actual and approximate transmission times, the above described calculations remain valid.

Figure 2:
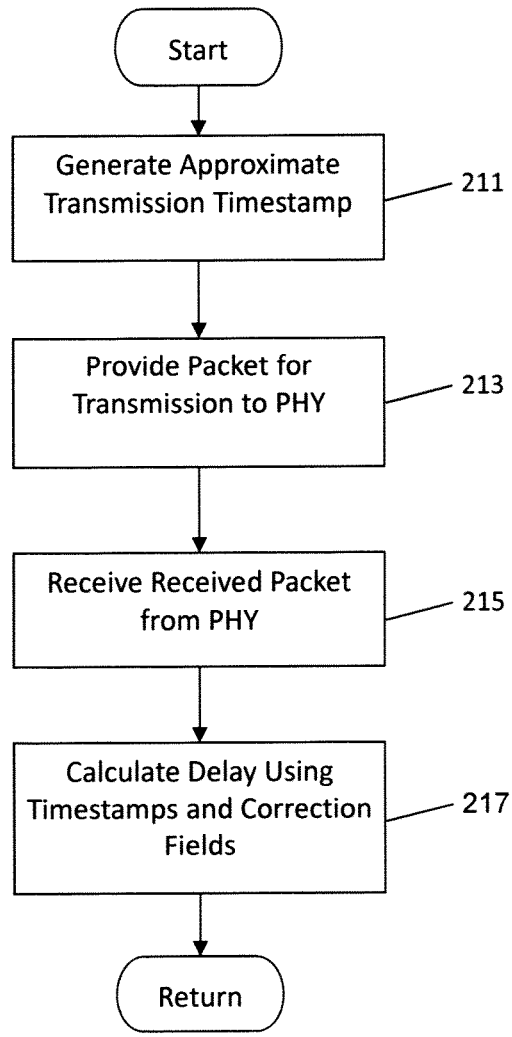
FIG. 2 is a flowchart of a timestamp related process performed by a higher layer portion in accordance with aspects of the invention.

FIG. 2 is a flowchart of a timestamp related process performed by a higher layer portion in accordance with aspects of the invention. The process may be performed by the higher layer portion 113a of the slave communication device of FIG. 1. The process may also be implemented by a higher layer processing block, for example, the higher layer processing block 505 of later discussed FIG. 5.

In block 211, the process generates an approximate transmission time in a packet containing a message that requests timing information from a receiving device. In some embodiments, the process directly uses a time value from a clock. In other embodiments, the process may adjust a time value from a clock for expected delays that may occur before the packet is transmitted. The approximate transmission time may be placed in a reserved field of the packet, for example a timestamp field. In some embodiments, the approximate transmission time may be appended to the packet or otherwise associated with the packet.

In block 213, the process provides the packet for transmission to a physical layer portion, for example the physical layer portion 113b of the slave communication device of FIG. 1 or the physical layer device 503 as later described with reference to FIG. 5. In general, the physical layer portion layer will determine an accurate time of transmission from the physical layer for the packet, adjust a correction field of the packet to account for differences between the approximate transmission time and the accurate transmission time, and transmit the packet to a recipient communication device. The recipient communication device is, in most embodiments, a master communication device, for example as discussed with respect to FIG. 1.

In block 215, the process receives a received packet from the physical layer portion. The received packet generally will have been transmitted by the recipient communication device in reply to the packet transmitted by the physical layer portion. The received packet includes the correction value stored in the correction field, as received by the receiving communication device, and the correction value may have been modified by devices to account for various as the packet traversed the communication network. The recipient communication device also includes in the packet a reception time at which it received the request packet.

In block 217, the process calculates the delay in the communication of the request packet through the communication network using the approximate transmission time and the data stored in the timestamp and correction fields of the received packet. In one embodiment, the process subtracts the correction values stored in the correction field from the approximate transmission time of block 211 from the reception time indicated in the received packet.

Figure 3:
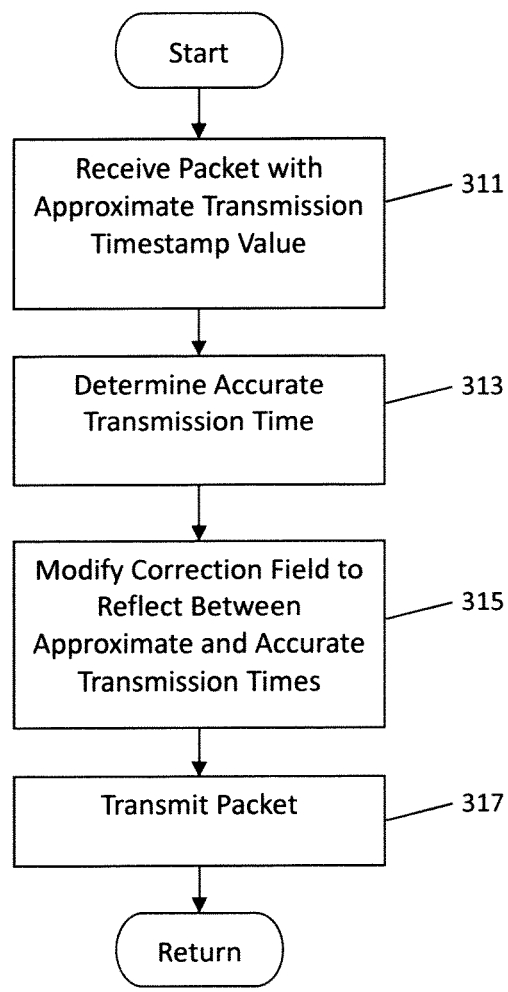
FIG. 3 is a flowchart of a transmit timestamp related process performed by a physical layer portion in accordance with aspects of the invention.

FIG. 3 is a flowchart of a transmit timestamp related process performed by a physical layer in accordance with aspects of the invention. The process may be performed by the physical layer portion 113b of the slave communication device of FIG. 1. The process may also be implemented by a physical layer device, for example, the physical layer device 503 of FIG. 5.

In block 311, the process receives a packet with an approximate transmission timestamp value from a higher layer, for example, from the higher layer portion 113a of the slave communication device of FIG. 1 or the higher layer processing block 505 as later described with reference to FIG. 5. The approximate transmission timestamp may be stored in a reserved field of the packet, for example a timestamp field. In some embodiments, the approximate transmission time may be appended to the packet or otherwise associated with the packet.

In block 313, the process determines an accurate transmission time for the packet. The accurate transmission time is highly accurate, on the order of nanoseconds.

In block 315, the process calculates a correction value to reflect the difference between the approximate transmission timestamp value of block 311 and the accurate transmission time of block 313. The correction value may be stored in a correction field. The correction value indicates how the approximate transmission time of block 311 may be corrected to determine the accurate transmission time. In many embodiments, the physical layer portion does not retain information the accurate transmission time.

In block 317, the process transmits the packet to a receiving communication device through a communication network. The packet contains information on the approximate transmission time and the correction value determined in block 315. Various devices in the communication network may modify the correction value, in some embodiments, to account for various delays as the packet traverses the communication network.

Figure 4:
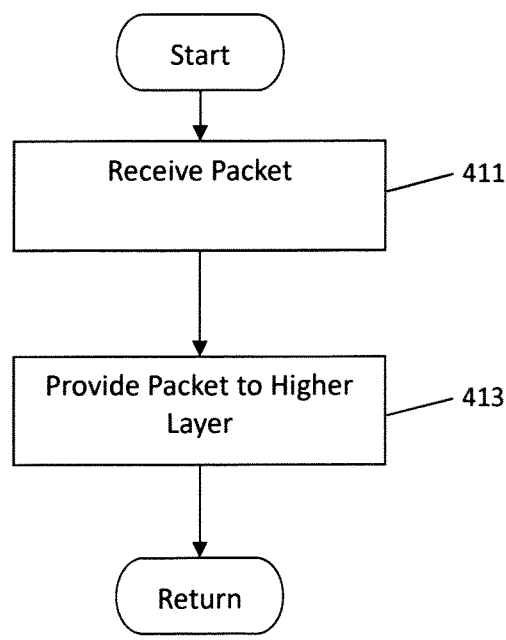
FIG. 4 is a flowchart of a receive timestamp related process performed by a physical layer portion in accordance with aspects of the invention.

FIG. 4 is a flowchart of a receive timestamp related process performed by a physical layer in accordance with aspects of the invention. The process may be performed by the physical layer portion 113b of the slave communication device of FIG. 1. The process may also be implemented by a physical layer device, for example, the physical layer device 503 of FIG. 5.

In block 411, the process receives a response packet from a recipient communication device. The response packet includes a time of receipt by the recipient communication device of a request packet previously transmitted by the physical layer portion. The request packet may be, for example, the packet transmitted by the physical layer portion in the process of FIG. 3. The response packet also includes a correction value. The correction value in some embodiments is the correction value in the packet transmitted by the physical layer portion in the process of FIG. 3 or, in some embodiments, as also subsequently modified by communication nodes as the packet traverses a communication network.

Figure 5:
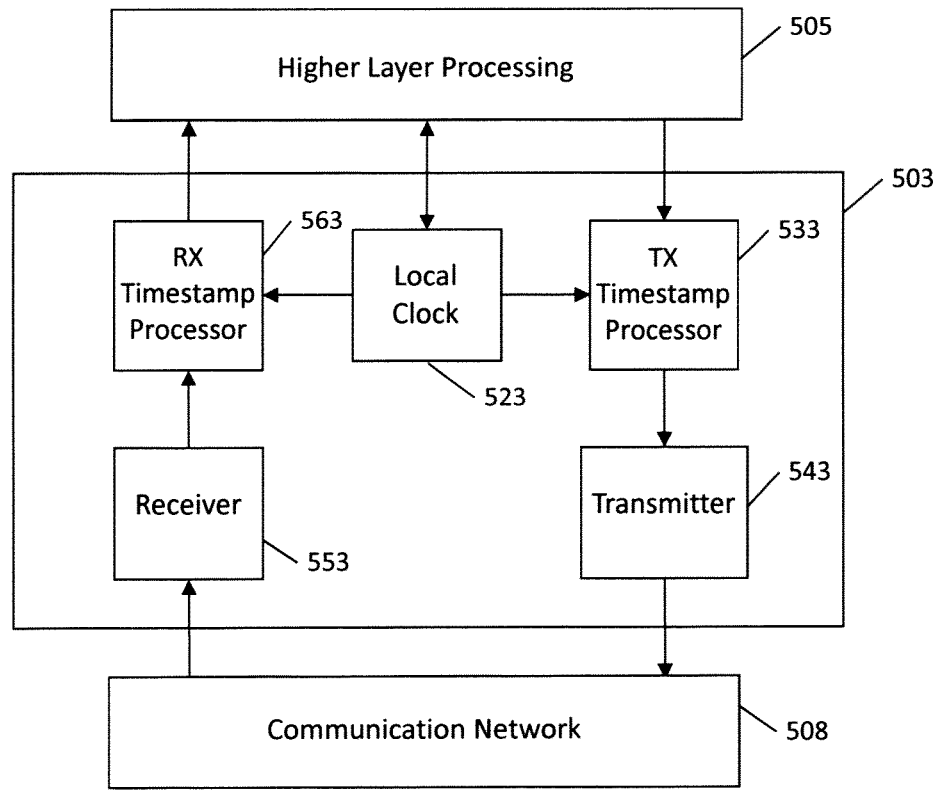
FIG. 5 is a block diagram including a communication device coupled to a communication network in accordance with aspects of the invention.

In block 413, the process provides the accurate reception time to a higher layer, for example, the higher layer portion 113a of the slave communication device of FIG. 1, or the higher layer processing block 505 of FIG. 5. Using the accurate reception time, in combination with transmission timestamps and correction values received in the packet, the higher layer portion may calculate a network delay for the packet, as described for example with reference to FIG. 2.

FIG. 5 is a block diagram of a communication device coupled to a communication network in accordance with aspects of the invention. The master communication device and/or the slave communication device of FIG. 1 may be devices similar to or the same as the communication device of FIG. 5. The communication device of FIG. 5 includes a physical layer device (PHY) 503 and a higher layer processing block 505, with the PHY coupling the higher level processing block to a communication network 508. The PHY transmits data to and receives data from the communication network in the form of packets of information. The data to be transmitted is generally provided to the PHY by the higher level processing block, and the PHY generally provides received data to the higher level processing block.

Some packets receive processing related to the times when the packets are transmitted. For example, a packet to be transmitted by the PHY 503 may be a packet that contains a message requesting a receiving communication device to reply with an indication of when it receives the packet. For example, the packet may include a Delay_Req message according IEEE Std. 1588. For each delay request packet, the higher-layer processing block 505 places a time value in the packet before supplying the packet to the PHY 503. The time value, in some embodiments, is placed in a reserved field of the packet. The time value is an approximate transmission time for the packet.

The transmit timestamp processing block 533 in the PHY 503 determines an accurate transmission time for the packet, calculates a difference between the accurate transmission time and the time value placed in the packet by the higher-layer processing block 505, and places an indication of the difference in the packet as a correction value. The correction value, in some embodiments, is placed in a correction field of the packet. In some embodiments, the correction field is limited in the range of values that may be indicated and the higher-layer processing block 505 inserts an approximate transmission time sufficiently close to the actual transmission time for the difference to be indicated in the correction field. The transmit timestamp processor 533 may also replace the approximate transmission time in the packet with a default value, for example, all zeros. Packets from transmit timestamp processor 533 are supplied to a transmitter 543 that converts the packets to a physical signal that is transmitted to the communication network 508.

The PHY 503 includes a local clock 523 that provides time values for use by the communication device. The transmit timestamp processing block may determine the accurate transmission time by utilizing a time value provided by the local clock 523 and by accounting for time required by the PHY for further processing of the packet prior to transmission. The local clock 523 clock is generally synchronized to other clocks in the device coupled to the communication network. In some embodiments, the local clock may be included in the higher-layer processing block 505 of the communication device, or the communication device may receive time values from external clock.

A second communication device of the communication network receives the packet that contains the message requesting the receiving communication device to reply with an indication of when it receives the packet. The second communication device determines the time it received the request packet and responds by transmitting a reply packet containing an indication of the time it received the packet. The time may be a value from a clock that is part of the second communication device. The second communication device may, for example, transmit the reply packet with a Delay_Resp message according IEEE Std. 1588. The reply packet includes the correction value from the request packet, which may have been modified by other devices in the communication network, and the indication of the time the second communication device received the request packet.

A signal carrying the reply packet is received by a receiver 553 of the communication device of FIG. 5. The receiver converts a physical signal to data packets. The reply packet is supplied to the higher-layer processing block 505 via a receive timestamp processor 563. The receive timestamp processor 563 may provide some packets receive processing related to the times when the packets were received. For example, the receive timestamp processor 563 may insert an indication of a time value from the local clock 523 indicative of when the packet is received by the communication device in a field of a packet. The receive timestamp processor 563 may, in various embodiments, additionally supply fields from the packet, such as the correction value and indication of the reception time by the second communication device, or pointers to where the fields are located in the packet.

The higher-layer processing block 505 uses the correction value, the reception time by the second communication device, and the approximate transmission time to calculate delay in the communication of the request packet through the communication network. The higher-layer processing block 505 may use the calculated delay to synchronize the local clock 523 to a clock in the second communication device. Notably, the higher-layer processing block 505 may add the correction value to the approximate transmission time for use as the actual transmission time of the request packet.

Accordingly, the communication device, in some embodiments, may not include a mechanism, such as a FIFO buffer, to supply the actual transmission time from the PHY 503 to the higher-layer processing block 505, or to store the actual transmission time until receipt of the delay response packet. By not directly receiving the actual transmission time from the PHY 503, the higher-layer processing block 505 may save processing resource for other operations and communication bandwidth from the PHY 503 to the higher-layer processing block 505 may also be utilized for other communication.

The PHY 503 may include additional blocks, for example, an interface block such as a media-independent interface for coupling to the higher-layer processing block 505, and in some embodiments various other processing and/or formatting blocks may also be included in the paths between the communication network 508 and the higher-layer processing block 505.

The transmit timestamp processor 533 and the receive timestamp processor 563 may, in some embodiments, include circuitry that is similar or the same. When one of the timestamp processors receives a packet, the packet is classified according to what type of timestamp processing, if any, is to be performed. The packets may be classified using various fields in the packets such as fields that signal source and destination addresses, virtual local area network identifiers, packet types, and timing message types. For packets that receive timestamp processing, the timestamp processor determines the reception time or transmission time. The times are generally referenced to when a particular part of the packet occurs on the boundary between the physical communication link and the PHY. Since the timestamp processors are separated from the reference points, the timestamp processors may measure, predict, or estimate delays due to the separation so that accurate time values are used.

The blocks of the communication device are generally implemented with electronic circuitry. For example, in one embodiment the PHY 503 is provided in a CMOS integrated circuit and the higher-layer processing block 505 is provided in another CMOS integrated circuit. Software programming may be used to control operation of some circuitry in the communication device. The higher layer processing block, in many implementations may be implemented as a programmable processor or as a plurality of blocks. In one embodiment, the higher-layer processing block 505 includes a programmable processor configured by program instructions to provide processing of some communication data.

Figure 6:
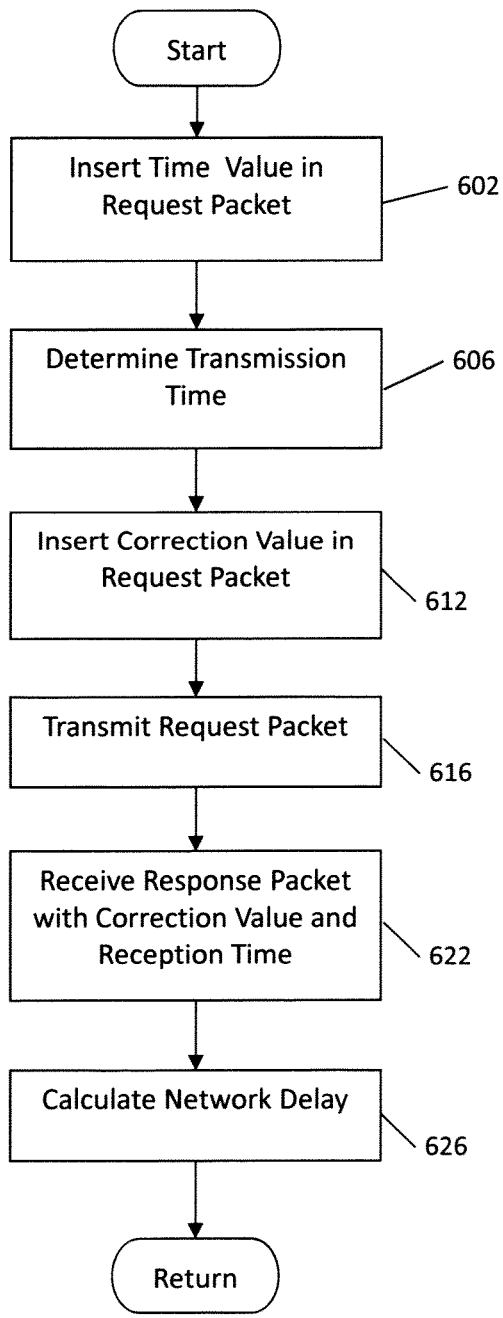
FIG. 6 is a flowchart of a process for handling timing information in accordance with aspects of the invention.

FIG. 6 is a flowchart of a process for handling timing information in accordance with aspects of the invention. The process may be performed by the slave communication device of FIG. 1 to send a packet requesting timing information and to receive a response. The process may also be implemented by a communication device, for example, the device of FIG. 5. Various parts of the process may be performed by specific circuitry of a communication device or by a programmable processor according to program instructions.

In block 602, the process inserts a time value in a packet containing a message that requests timing information from a receiving device. For example, the packet may include a PTP delay_req or pdelay_req message. The time value inserted by the process is an approximate time that the packet will be transmitted. In some embodiments, the process directly uses a time value from a clock. In other embodiments, the process may adjust a time value from a clock for expected delays that may occur before the packet is transmitted. The time value may be inserted in a field in the packet that is defined by PTP as a reserved field. In some embodiments, the time value may be appended to the packet or otherwise associated with the packet.

In block 606, the process determines the transmission time for the request packet. The transmission time may be determined using circuitry of a physical layer device as described with reference to FIG. 5. The transmission time determined in block 606 is highly accurate, for example, on the order of nanoseconds. In contrast, the time value inserted in the packet in block 602 is less accurate, for example, on the order of microseconds.

In block 612, the process inserts a correction value in the request packet. The correction value indicates how the time value from block 602 may be corrected to determine the accurate transmission time. Accordingly, the process may calculate the correction value by subtracting the time value of block 602 from the transmission time determined in block 606. After calculating the correction value, the process may discard the accurate transmission time however, the time value of block 602 is retained for subsequent use.

In block 616, the process transmits the request packet with the correction value. The process is transmitted to a receiving communication device through a communication network. The communication network may include intervening devices, such as switches or routers, as well as physical links between the devices. Some intervening devices may modify the correction value, for example, by adding a value to indicate delay in the intervening devices.

In block 622, the process receives a response packet. The response packet was transmitted by the receiving communication device in reply to the request packet transmitted by the process in block 616. The receiving communication device copies the correction value, possibly modified from the value of block 612, from the request packet to the response packet. The receiving communication device also includes an indication of the time it received the request packet in the response packet.

In block 626, the process calculates a network delay. In one embodiment, the process subtracts the sum of the correction value received in the response packet and the time value of block 602 from the reception time received in the response packet. Time bases used by the process for the transmission time and by the receiving communication device for the reception time are generally separate. Other timing-related information, for example, a delay measurement for a packet to arrive from the receiving communication device to the process, may be used to correct for differences in the time bases or to synchronize the time bases.

Accordingly, the invention provides for packet based timing measurements. Although the invention has been described with respect to specific embodiments, it should be recognized that the invention comprises the novel and non-obvious claims supported by this disclosure, along with their insubstantial variations.

What is claimed is:

1. A method of determining a time of transit of a packet over a communication network, comprising:
providing a physical layer portion of a slave communication device a packet including a value indicating an approximate time of transmission of the packet by the slave communication device;
having the physical layer portion of the slave communication device insert a correction value into the packet, the correction value indicating a difference between the approximate time of transmission and an actual time of transmission of the packet by the slave communication device;
transmitting, by the physical layer portion of the slave communication device, the packet to a master communication device;
receiving, by the slave communication device, a responsive packet from the master communication device, the responsive packet including a time value indicating a time of receipt of the packet by the master communication device and an indication of the correction value; and calculating the time of transit by the packet over the communication network using the approximate time of transmission, the indication of the correction value, and the time of receipt by the master communication device.

2. The method of claim 1, wherein the calculating the time of transit is performed in a higher layer of the slave communication device.

3. The method of claim 2, wherein the higher layer is a media access controller (MAC).

4. The method of claim 1, wherein the packet sent by the physical layer portion of the slave communication device comprises a delay request message.

5. The method of claim 1, wherein the responsive packet received by the master communication device comprises a delay request message.

6. The method of claim 1, wherein the master communication device and slave communication device follow precision time protocol (PTP).

7. The device of claim 1, wherein the physical layer portion does not retain information of the actual time of transmission after transmission of the packet transmission time information.

8. A network communication device for determining a time of transit for a packet over a communication network, comprising:
at least one port for transmitting and receiving network packets;
a higher layer configured to provide packets to a physical layer, at least some of the packets including a value indicating an approximate time of transmission of the packet by the communication device; and
the physical layer configured to insert a correction value in at least some of the packets the correction value indicating a difference between the approximate time of transmission and the actual time of transmission of the packet by the communication device, to transmit the packet over a communication network to a master communication device, to receive responsive packets from the master communication device, at least some of the responsive packets including a time value indicating a time of receipt of the packet by the master communication device and the correction value.

9. The device of claim 8, wherein the higher layer is a media access controller.

10. The device of claim 8, wherein the physical layer portion is an integrated circuit.

11. A method for determining a time of transit for a packet over a communication network, comprising:
receiving from a media access controller (MAC) by a packet physical layer portion of a slave communication device, the packet including a value indicating an approximate time of transmission of the packet by the slave communication device;
modifying a correction field of the packet to indicate a difference between the approximate time of transmission and an actual time of transmission of the packet by the slave communication device;
transmitting the packet from the physical layer portion of the slave communication device over a communication network to a master communication device;
receiving, by the slave communication device, a responsive packet from the master communication device, the responsive packet including a time value indicating a time of receipt of the packet by the master communication device and the correction value; and
calculating the time in transit of the packet over the communication network using the approximate time of transmission, the correction value, and the time of receipt by the master communication device.

12. The method of claim 11, wherein the correction value is a time value measurement.

13. The method of claim 11, wherein the packet sent by the physical layer portion of the slave communication device comprises a delay request message.

14. The method of claim 11, wherein the packet sent by the master communication device comprises a delay response message.

15. The method of claim 11, wherein the physical layer portion of the slave device does not retain transmission time information.

16. The method of claim 11, wherein the correction value is further corrected for resident time in a device on the communication network.

17. The method of claim 11, wherein the calculation is performed in a higher layer of the slave communication device.

* * * * *